May 8, 1956   E. A. DAVIS   2,744,972
SWITCHING SYSTEM
Filed Aug. 10, 1953   3 Sheets-Sheet 1

INVENTOR
EDWARD A. DAVIS
BY
*Semmes & Semmes*
ATTORNEYS

May 8, 1956  E. A. DAVIS  2,744,972
SWITCHING SYSTEM
Filed Aug. 10, 1953  3 Sheets—Sheet 2
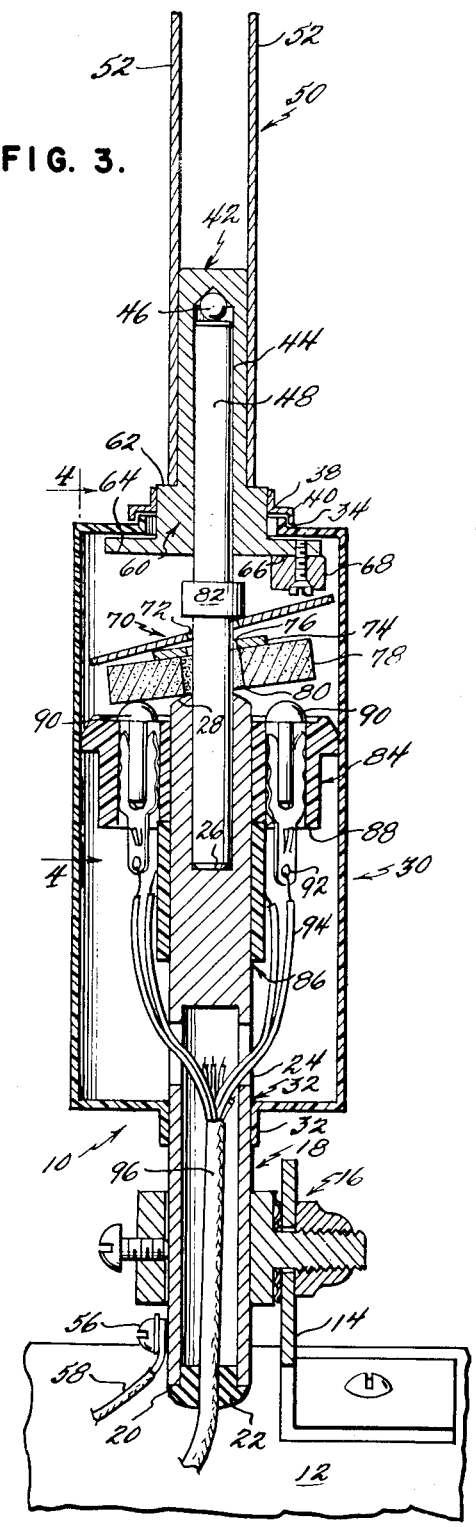
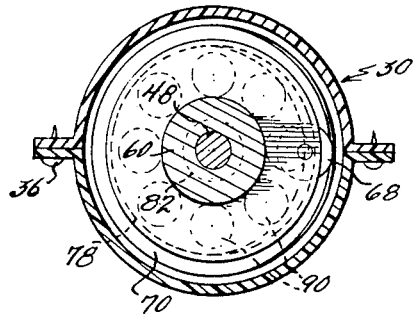
FIG. 5.
FIG. 4.
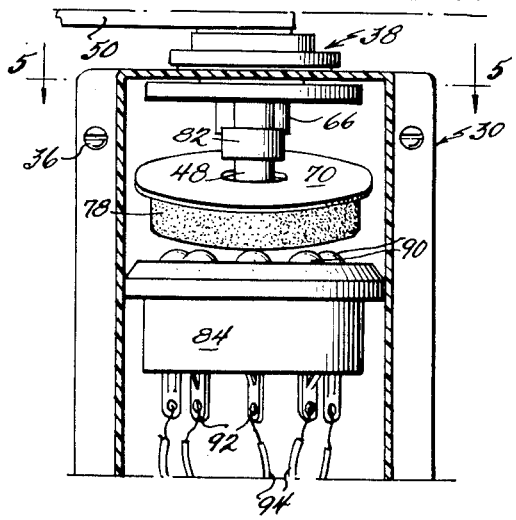
FIG. 6.
INVENTOR
EDWARD A. DAVIS
BY  *Semmes & Semmes*
ATTORNEYS May 8, 1956

E. A. DAVIS 2,744,972

SWITCHING SYSTEM

Filed Aug. 10, 1953

INVENTOR
EDWARD A. DAVIS

BY *Semmes & Semmes*

ATTORNEYS

2,744,972

SWITCHING SYSTEM

Edward A. Davis, Harwichport, Mass.

Application August 10, 1953, Serial No. 373,191

10 Claims. (Cl. 200—23)

The present invention relates to switching systems and more specifically to means for the transmission of external forces such as wind to effect positive working contact with one or more contact receiving elements adapted to conduct energy therethrough.

Various means have been devised for indicating the variations in direction of movement of natural forces. Such devices fall within the definition: Anemoscope. Certain such direction indicating devices have been made the subjects of patents. In each of the known devices, means are provided for supporting a vane structure upon a support member and for transferring the rotational movement of the vane structure to the support structure to effect directional registry upon at least one registry member. Heretofore, inventors have been primarily concerned with means for making sliding rotational contact between vane structure assemblies and directional indicating plates adapted to conduct a current from a source through a ground to effect registry upon a directional indicating scope. The applicant, Edward A. Davis obtained United States Patent No. 2,266,172 in this field. Subsequently, P. Van S. Kolff obtained United States Patent No. 2,611,051 for a rotary contactor device. These inventions were related to the implementation of selective contact to complete a circuit for luminous registry upon a direction indicating scope.

In the prior art, rotary contact or oscillating devices developed static and were subject to extreme wear as a result of sliding contact between vane assembly and distributor contact points. The wobble action of the later devices, magnetically controlled, developed weak contact due to the attraction of the contacting member for the magnet away from the area of contact. Excessive friction was established between contactor and contactor support, such friction being undesirable in obtaining accurate bearings readings where there may be faint winds. Moreover, materials which are magnetically permeable and which were used for contactor elements have been found inadequate as electrical conductors. In addition, magnetically permeable materials used in prior art devices were of necessity accurately machined, close tolerances being required to create operative anemoscopes.

Whereas the present invention is not specifically limited to the selective closing of an electrical contact, one phase of the invention is related thereto. Broadly, the invention comprises means for responding to variations in the direction of wind wherein said means is adapted to move a magnet relative thereto circularly about a support. Lever means responsive to the field of magnetic attraction is placed in floating and rotational relation to the magnetic field. The lever being restrained is adapted to force a magnetically impermeable substance downwardly against at least one contact member to effect the closing of a circuit as in the case of an electrical device or reciprocal plunging motion as in the case of a mechanical device.

It is an object of this invention to provide a system, for use in anemoscopes and related devices, wherein the means for transmitting directional signals includes frictionally free cam means adapted to displace a corresponding contactor element similarly disposed to enhance contact pressure characteristics, and to provide a sensitive working unit having maximum efficiency and wear qualities.

Another object of this invention is to employ a contactor member for a wind directional indicating device wherein the contactor member may consist of materials having maximum conductive and lubricating qualities and which may be readily fabricated from unfinished stock.

Other basic objects of the invention relate to: a reduction in torque in transmission elements of selective contactor devices; the establishment of positive non-arcing electrical contact; the reduction of electrical erosion in switching systems; the facility of assemblage by the employment of readily fabricated and freely mountable elements rendered non-useful by prior constructions adapted to obtain similar yet less efficient results; the elimination of metal to metal contact in the path of current flow; and the elimination of the need for external lubrication for moving parts.

A preferred means for carrying out the present invention is shown in the appended drawings wherein:

Fig. 3 is a vertical, sectional view of the invention taken along the lines 3—3 of Fig. 1;

Fig. 4 is a vertical, sectional view of the invention taken along the lines 4—4 of Fig. 3;

Fig. 5 is a horizontal sectional view taken along the lines 5—5 of Fig. 4 showing the relationship of the transmission elements;

Fig. 6 is a view in perspective of a modified lever member;

Figure 9:
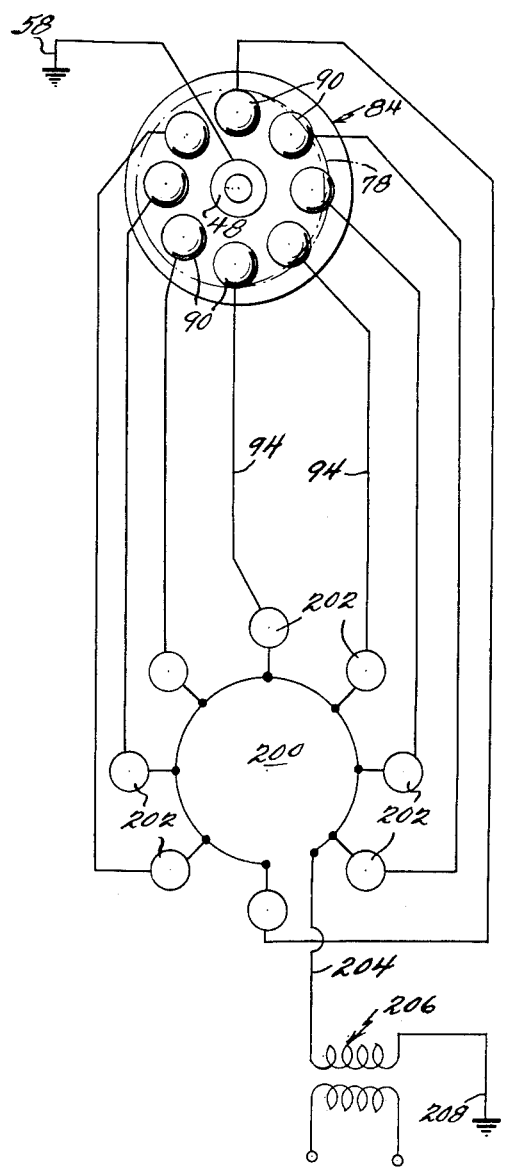
Figure 10:
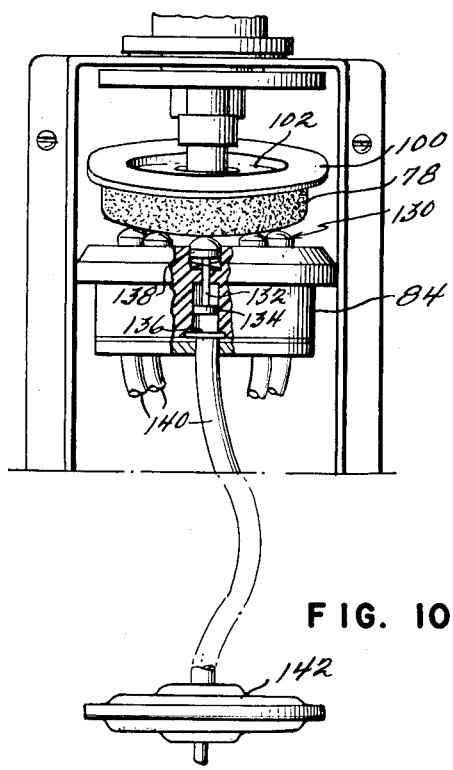

Fig. 9 relates to the circuitry which may be employed in the forms of the invention shown in Figs. 1, 2, 3 and 4; and Fig. 10 is a modification of the invention taken along the lines 4—4 of Fig. 3 and showing a mechanical adaptation thereof.

Figure 1:
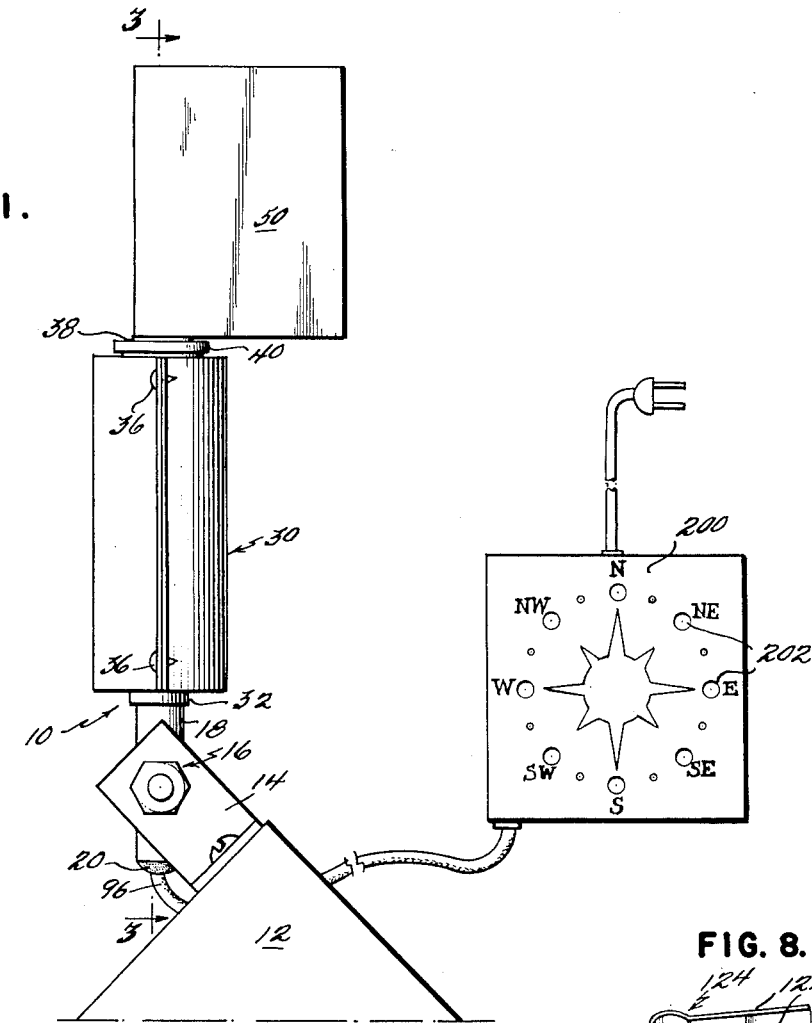
Fig. 1 is a side elevational view of the invention.
Figure 2:
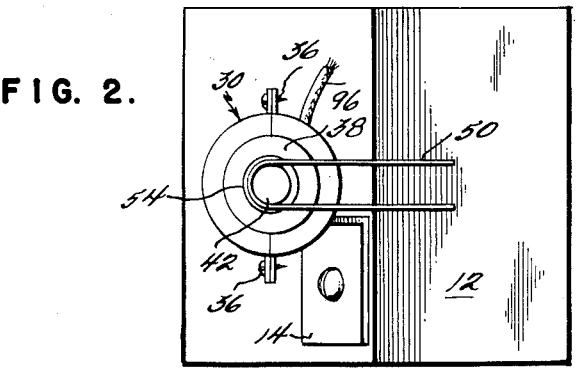
Fig. 2 is a top plan view of the invention.

Referring to Figs. 1 and 2 of the drawings, there is shown a switching system 10 consisting of a base 12, a mounting bracket 14, said mounting bracket 14 being adapted for universal adjustment with a frictional support receiving member 16. Frictionally engaging support 16 is the support standard 18. Support standard 18 extends vertically upwardly of the device and is adapted to receive and support the major working elements of the invention. Internal extension stem 48 and external adaptor 42 are both supported by the standard support 18; the stem is in fixed relation to the standard and the adaptor is in rotatable engagement with the stem.

A casing member 30 may consist of two semi-circular cover portions secured together as at 36 to form a cylinder. At the bottom of the cover 30, a collar 32 may depend to provide a bottom closure for the casing. A circular roofing 38 is shown to encompass the upper portion of the casing 30 to prevent rain seepage into the working elements of the device. Shield 40 of casing 38 encompasses an annular projection 34, attached to the cover 30. The cover 30 is made of a dielectric material.

A vane member 50 is secured in fixed relation to the extension 42.

Leading from the standard support 18 is a conduit 96 adapted to encase a plurality of electrical conductors each of which is connected at one end to signal lamps 202 of an indicating scope 200 and at another end to a plurality of contact points set within the casing 30.

In Fig. 3 of the drawings the detailed structure of one form of the device is shown. Standard 18 is shown to have a cylindrical portion 20 at the base thereof, said portion being adapted to contain the conduit 96 and to retain said conduit within the support as by an adaptor 22. A plurality of apertures 24 pass through the support member 18 to guide conductors 94 therethrough. Upon an upper portion of the support 18 there is provided a channel 26 adapted to receive an extension rod 48 in semi-fixed engagement. The extension rod 48 and the support member 18 together, comprise the standard for the major working elements of the invention. Upon the upper extremity of the standard support 18, an annularly bevelled surface 28 is machined for bearing a contactor element 78 described hereinafter.

Again with reference to Fig. 3 of the drawings, a rotatable external adaptor 42 engages the support extension 48 by means of a ball bearing 46. Adaptor 42 is provided with an axially machined orifice 44 adapted to receive the fixed shaft 48 in bearing relation thereto. Vane means 50 consists of at least one wind engaging surface 52, and an adaptor engaging surface 54. Preferably, the vane 50 comprises at least two element engaging surfaces 52 joined as at 54 to form a U-shaped spring vane bent upon itself, at the point of adaptor contact.

The support standard 18 is preferably made of an electrically conductive substance. This support serves as a ground conductor to carry a load through one or more contact points to the contactor and again through the ground 18 to which is secured a ground lead 58 engaging the standard 18 as at 56.

A lower portion of the vane adaptor 42 is shown as at 60. This lower portion 60 consists of a cylinder section 62 having disc like flange 64 protruding outwardly therefrom to provide a mounting 66 for the magnet 68 fixedly secured eccentrically thereto.

A magnetically permeable lever member 70 in the form of a disc is passed onto the shaft 48 axially thereof as at 72. Aperture 72 is cut centrally of the lever member 70 and is sufficiently wide to enable the lever member 70 to engage the support extension 48 as by floating rotation in cam relation. A spacer 74 engages the shaft 48 as at 76 in a manner similar to that of the lever member 70 with respect to shaft 48. Spacer 74 serves as an auxiliary lever member.

A contact member 78 is placed beneath the spacer 74 to engage the shaft 48 as at 80. Contact member 78 is composed of a magnetically impermeable material adapted to effect maximum conductivity of electrical energy from a plurality of contacts to the standard support 18. Carbon, graphite or compositions of these and other lubricant materials with metal can be substituted in accordance with the desired wear, lubricant and conductivity characteristics. The contact member, as the spacer and lever member, is provided with an aperture centrally therethrough and suitable for effecting floating rotation thereof about the shaft extension 48.

Spaced along the shaft 48 and in adjustable relation thereto, there is provided a semi-fixed collar member 82. Collar 82 serves as a fulcrum for the lever 70, one portion of the lever being constantly proximate to the magnetic field produced by the eccentrically disposed magnetic member 66. By virtue of the relation of the lever member 70 with the fulcrum member 82 and the spacer 74, a compound lever system is effected against the contact member 78.

A dielectric contact housing 84 is fixed to the upper portion of the standard 18. This housing is adapted to contain a plurality of contactors 90, for peripheral spacing about the support 18. Within the housing 84 there are a plurality of apertures 88 passing therethrough for receiving the contactor points and connectors 92.

One form of circuitry which may be used to carry out the present invention is shown schematically in Fig. 9 of the drawings. Again, the contact points are shown as at 90 peripherally disposed about a housing 84. The support member is shown centrally of the housing 84 as at 18 and the contactor disc 78 is in phantom detail. In the form shown herein, the circuit lies from ground 58 through the conductor-standard 18, contactor 78 to contactor points 90; therethrough to contactor point jacks 92 through lead wires 94 to terminals at the plurality of lamps 202 disposed radially about scope 200 and thence through a concentric conductor 204 through transformer 206 and finally to ground 208.

Figure 7:
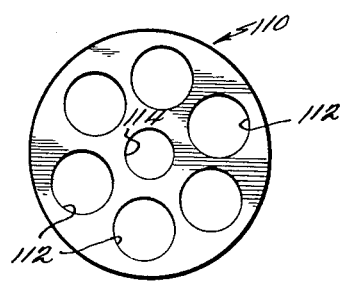
Fig. 7 is a plan view of a further modification of a lever member.

Structural modifications of the lever member of Fig. 3 are illustrated in Figs. 6 and 7 respectively. With respect to the modification shown in Fig. 6, the spacer 74 and the lever member 70 of Fig. 3 have been combined into a unitary structure wherein the unitary lever 100 comprises a circular magnetically permeable disc having a depression 102 formed concentrically inwardly of the periphery of the disc. Within the disc 100 there is provided an aperture 104 centrally thereof for passage over the shaft 48 of the device. The base of the depression 102 is adapted to serve the same function as the secondary lever-spacer 74 shown in Fig. 3. The modification shown in Fig. 7 again is made of a magnetically permeable material, this particular modification 110 having a plurality of perforations 112 spaced peripherally about the center of the device, the center being defined by an aperture 114 adapted for passage over a shaft 48. In the utilization of this modification, a lever-spacer 74 is required for direct contact with contactor member 78. By virtue of the construction shown, direct contact to the spacer 74 is maintained while the magnetically permeable lever 110 is attracted to the magnetic field within which it resides.

Figure 8:
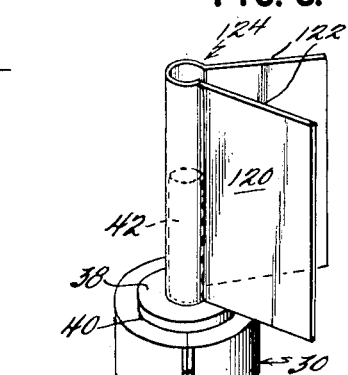
Fig. 8 is a view in perspective fragment showing a form of vane means modified over that shown in Figs. 1, 2 and 3.

A modified vane structure is shown in Fig. 8 wherein the vane 120 comprises at least two exposed members 122 flaring angularly outwardly from a frictionally engaging bend 124 joining the wind engaging members 122.

In operation, the vane 50 may be rotated as by variations in prevailing winds to certain bearings. Each bearing is transmitted by the vane engaging adapter 42 to the eccentrically disposed magnetic member 68, such that the bearing may be registered by magnetically attracting the lever member 70 upwardly. Thus the lever member 70 is impinged upwardly against the fulcrum 82 and again by the downward thrust against the spacer 74 for imposing leverage upon the contactor-lever 78 between the contact point 90 and the bevelled surface 28 of ground standard 18. Referring to Fig. 4, the specific operative relation of parts is shown in some detail. It is there shown that the lever member 70 does not actually engage the magnetically disposed element 68, nor as shown in Fig. 3 does the lever 70 engage the contact member 78. One of the principal features of the device resides in the inherent quality thereof to effect positive contact as shown in Fig. 4, with one or more points such that the rotational disposition of the magnet 68 shall not disturb contact by wiping or sliding motion as is prevalent in devices heretofore constructed. The lever 70 being made of a magnetically permeable material and the contactor 78 being made of a non-magnetic highly conductive substance, maximum efficiency of operation is obtained. Moreover, the floating and rotational disposition of the lever and associated contact element permit desired non-wiping contact and a responsive sensitivity heretofore unknown.

A modification of the invention is shown in Fig. 10 wherein the compound lever system previously described is adapted to mechanical means as opposed to means for effecting electrical contact. In Fig. 10, there is shown a unitary lever element 100 having a depression 102 suitable for transmitting the downward force of the lever against a contact member 78. In this instance, as in the original construction, the cam-like force of depression 102 on contact member 78 is effected intermediate of the point of contact and the beveled surface of support 18 rockably supporting the contact member. Contact member 78 is preferably made of a lubricant material such as a graphite. As in the aforementioned innovation, so here, contact members are arranged peripherally about the support standard. In this modification, the contact members 130 comprise reciprocably operable piston units which are spring loaded for return to battery upon release from contact. The unit 130 consists of a shaft 132 and piston 134 suitably recessed in the support housing 84. Chambers 136 and 138 respectively confine the piston and cam thereof for movement within the housing 84. At the lower extremity of the chamber 136 there is provided a suitable valve for restricting back pressures into the chamber. From chamber 136, there is provided a conduit 140 for transferring pressures to a bellows 142. Bellows 142 is adapted to convert pressure to mechanical energy.

By the device herein shown, the force of wind may be utilized to transmit mechanical force through a movable magnetic field and an innerconnected leverage system, to effect work or alternatively to provide means for effecting mechanical registry for indicating the varying disposition of wind direction.

Whereas the invention has been described in its preferred form, applicant gives notice that various modifications in structure may be made without departing from the spirit of the invention. Accordingly the invention is to be limited only as defined in the claims appended hereto.

I claim:

1. A switching system comprising in combination, a central support, a contact disc mounted to tilt in all directions on the support, a plurality of stationary electrical contacts mounted on said support in spaced relation to each other and in contactable proximity to the periphery of the contact disc, a lever disc of magnetic material mounted in engageable proximity to the opposite face of the contact disc from said contacts to tilt in all directions into tilting engagement with the contact disc to tilt the contact disc into electrical contact with said contacts selectively in accordance with the direction of tilt of said lever disc, a rotatable magnet mounted on said support to move in a circular path proximate the periphery of said lever disc, said lever disc being in a state of continuous attraction to said magnet whereby said lever disc is tilted to tilt the contact disc into contact with said contacts selectively in accordance with the rotated position of the magnet relative to the support.

2. A switching system according to claim 1 in which said contacts are reciprocably mounted on the support for valvular motion.

3. In a device of the character described in claim 1, spacer means for transmitting leverage from said lever disc to said contact disc, said spacer means being floatingly mounted on the support intermediate said lever disc and said contact disc, to transmit leverage to said contact disc at a point intermediate the support and the means defining at least one contact.

4. A device of the type described in claim 1 in which said contact disc is composed of a lubricant material.

5. A device according to claim 1 further comprising an adjustable fulcrum member mounted upon the support between said magnet and said lever disc.

6. A device of the character described in claim 5, in which said fulcrum member consists of a collar.

7. In a device of the character described in claim 1, lever disc having a circular depression formed in coaxial relation to the lever disc, to engage the contact disc intermediately of its axis and the peripheral contact area of the contact disc.

8. A switching system comprising an upright standard; a rotatable eccentric bearing upon the standard; a vane engaging the eccentric and adapted to rotate said eccentric about the standard; magnetic means mounted upon the eccentric for rotation thereabout; a magnetically permeable lever member floatingly mounted upon the standard for rotation thereabout in the magnetic field of the magnetic means; a restraining collar secured to the standard providing a fulcrum for the lever member interposed along the standard between the eccentric and the lever; spacer means axially engaging the standard for contact with the contactor; said spacer means being interposed between the lever member and a contactor; and a non-magnetic contactor element floatingly disposed beneath said spacer and mounted in axial alignment therewith; said lever engaging said contactor through said spacer in an area intermediate of the axis of the standard and the area of contact of the said contactor element, and means on the standard defining at least one contactor point in the path defined by the non-magnetic contactor element.

9. A device of the character described in claim 8, in which said standard and said contactor element are electrically conductive and in which said points are electrically energized.

10. A device of the character described in claim 8 wherein said points are reciprocably mounted for valvular motion.

References Cited in the file of this patent

UNITED STATES PATENTS

| | | |
|---|---|---|
| 2,097,838 | Karrer | Nov. 2, 1937 |
| 2,410,746 | Raettig | Nov. 5, 1946 |
| 2,611,051 | Kolff | Sept. 16, 1952 |